United States Patent
Shimada

(10) Patent No.: US 7,920,334 B2
(45) Date of Patent: Apr. 5, 2011

(54) ZOOM LENS SYSTEM, OPTICAL APPARATUS AND METHOD FOR ZOOMING THE SAME

(75) Inventor: Toshiyuki Shimada, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/172,379

(22) Filed: Jul. 14, 2008

(65) Prior Publication Data

US 2009/0015940 A1    Jan. 15, 2009

(30) Foreign Application Priority Data

Jul. 12, 2007 (JP) ................... 2007-183289

(51) Int. Cl.
*G02B 15/14* (2006.01)
(52) U.S. Cl. .................. 359/689; 359/683; 359/900
(58) Field of Classification Search .................. 359/689, 359/683, 900
See application file for complete search history.

(56) References Cited

U.S. PATENT DOCUMENTS

| 7,215,483 B2 | 5/2007 | Sekita |
| 7,446,956 B2 | 11/2008 | Shimada |
| 7,453,642 B2 * | 11/2008 | Fujimoto et al. ............. 359/557 |

FOREIGN PATENT DOCUMENTS

| JP | 2006-084829 A | 3/2006 |
| JP | 2006-208890 A | 8/2006 |
| JP | 2007-121459 A | 5/2007 |
| JP | 2007-333799 A | 12/2007 |
| JP | 2008-015433 A | 1/2008 |

* cited by examiner

*Primary Examiner* — Jack Dinh
(74) *Attorney, Agent, or Firm* — Miles & Stockbridge P.C.

(57) ABSTRACT

Providing a zoom lens system being compact with high optical performance, an optical apparatus using the same, and a method for zooming the zoom lens system. The system includes, in order from an object along an optical axis, a first lens group G1 having negative refractive power, a second lens group G2 having positive refractive power, and a third lens group G3 having positive refractive power. Upon zooming from a wide-angle end state W to a telephoto end state T, each distance between adjacent lens groups is varied. Given conditional expression is satisfied.

25 Claims, 12 Drawing Sheets

ZOOM LENS SYSTEM, OPTICAL APPARATUS AND METHOD FOR ZOOMING THE SAME

The disclosure of the following priority application is herein incorporated by reference:

Japanese Patent Application No. 2007-183289 filed on Jul. 12, 2007.

BACKGROUND OF THE INVENTION

1. Field of the Invention

The present invention relates to a zoom lens system, an optical apparatus and a method for zooming the zoom lens system suitable for a still camera and a digital camera.

2. Related Background Art

Recently, an imaging optical apparatus such as a digital still camera, and a digital video camera using a solid-state imaging device has increasingly become high-performance and compact. In such an imaging optical apparatus, a zoom lens is generally used as an image-taking lens, so that it becomes possible for a photographer to easily take a picture with an ideal angle of view most suitable for the scene.

Among such zoom lenses, most of those installed in compact imaging optical apparatuses have a zoom ratio of about three, and most of them have a negative-leading type zoom lens in which a negative lens group is disposed to the most object side and at least one positive lens group is disposed to the image side thereof (for example, Japanese Patent Application Laid-Open No. 2006-208890).

However, a negative-leading type zoom lens tends to have a longer total lens length with respect to a focal length thereof. The tendency becomes conspicuous as making the angle of view in the wide-angle end state wider, or making the zoom ratio of the zoom lens larger. When such a zoom lens is forcibly made to be compact, refractive power of each lens group becomes too strong, so that it becomes difficult to correct aberrations. For example, the zoom lens disclosed in Japanese Patent Application Laid-Open No. 2006-208890 can be widened the angle of view. However, the zoom lens itself becomes extremely large with unrealistic dimension.

SUMMARY OF THE INVENTION

The present invention is made in view of the aforementioned problems and has an object to provide a zoom lens system having excellent optical performance with accomplishing to be compact, an optical apparatus using the zoom lens system, and a method for zooming the zoom lens system.

According to a first aspect of the present invention, there is provided a zoom lens system comprising, in order from an object along an optical axis: a first lens group having negative refractive power; a second lens group having positive refractive power; and a third lens group having positive refractive power; upon zooming from a wide-angle end state to a telephoto end state, each distance between adjacent lens groups varying, and the following conditional expression (1) being satisfied:

$$0.44 < (Nnav - 0.80) \times ft \times \tan \omega w / TLw < 0.90 \quad (1)$$

where Nnav denotes an average of refractive indices at d-line (wave length $\lambda=587.6$ nm) of all negative lenses included in the zoom lens system, ft denotes a focal length of the zoom lens system in the telephoto end state, $\omega w$ denotes a half angle of view of the zoom lens system in the wide-angle end state, and TLw denotes a total lens length of the zoom lens system in the, wide-angle end state.

According to a second aspect of the present invention, there is provided an optical apparatus equipped with the zoom lens system according to the first aspect.

According to a third aspect of the present invention, there is provided a zoom lens system comprising, in order from an object along an optical axis: a first lens group having negative refractive power; a second lens group having positive refractive power; and a third lens group having positive refractive power, upon zooming from a wide-angle end state to a telephoto end state, at least the first lens group and the second lens group being moved such that a distance between the first lens group and the second lens group varies, and a distance between the second lens group and the third lens group varies, and the following conditional expressions (3) and (4) being satisfied:

$$0.21 < ft \times |X2| / TLw^2 < 0.30 \quad (3)$$

$$0.43 < L23w/f2 < 0.80 \quad (4)$$

where ft denotes a focal length of the zoom lens system in the telephoto end state, X2 denotes the maximum moving amount of the second lens group upon zooming from the wide-angle end state to the telephoto end state, TLw denotes a total lens length of the zoom lens system in the wide-angle end state, L23w denotes a distance along the optical axis between the most image side lens surface of the second lens group and the most object side lens surface of the third lens group in the wide-angle end state, and f2 denotes a focal length of the second lens group.

According to a fourth aspect of the present invention, there is provided a zoom lens system comprising, in order from an object along an optical axis: a first lens group having negative refractive power; a second lens group having positive refractive power; and a third lens group having positive refractive power, upon zooming from a wide-angle end state to a telephoto end state, at least the first lens group and the second lens group being moved such that a distance between the first lens group and the second lens group varies, and a distance between the second lens group and the third lens group varies, and the following conditional expressions (5) and (6) being satisfied:

$$0.36 < Nn - Np < 0.80 \quad (5)$$

$$3.00 < Nn + 0.05 \times vn \quad (6)$$

where Nn denotes refractive index of the negative lens in the second lens group at d-line (wavelength $\lambda=587.6$ nm), Np denotes refractive index of the positive lens in the second lens group at d-line (wavelength $\lambda=587.6$ nm), and vn denotes Abbe number of the negative lens in the second lens group at d-line (wavelength $\lambda=587.6$ nm).

According to a fifth aspect of the present invention, there is provided a method for zooming a zoom lens system comprising steps of: providing the zoom lens system including, in order from an object along an optical axis, a first lens group having negative refractive power, a second lens group having positive refractive power, and a third lens group having positive refractive power; satisfying the following conditional expression (1):

$$0.44 < (Nnav - 0.80) \times ft \times \tan \omega w / TLw < 0.90 \quad (1)$$

where Nnav denotes an average of refractive indices at d-line (wave length $\lambda=587.6$ nm) of all negative lenses included in the zoom lens system, ft denotes a focal length of the zoom lens system in the telephoto end state, $\omega w$ denotes a half angle of view of the zoom lens system in the wide-angle end state, and TLw denotes a total lens length of the zoom lens system in the wide-angle end state; and varying each distance between adjacent lens groups upon zooming from a wide-angle end state to a telephoto end state.

The present invention makes it possible to provide a zoom lens system having excellent optical performance and compactness, an optical apparatus and a method for zooming the zoom lens system.

BRIEF DESCRIPTION OF THE DRAWINGS

FIGS. 2A, 2B and 2C are graphs showing various aberrations of the zoom lens system according to Example 1 upon focusing on infinity, in which FIG. 2A shows a wide-angle end state, FIG. 2B shows an intermediate focal length state, and FIG. 2C shows a telephoto end state.

FIGS. 4A, 4B and 4C are graphs showing various aberrations of the zoom lens system according to Example 2 upon focusing on infinity, in which FIG. 4A shows a wide-angle end state, FIG. 4B shows an intermediate focal length state, and FIG. 4C shows a telephoto end state.

FIGS. 6A, 6B and 6C are graphs showing various aberrations of the zoom lens system according to Example 3 upon focusing on infinity, in which FIG. 6A shows a wide-angle end state, FIG. 6B shows an intermediate focal length state, and FIG. 6C shows a telephoto end state.

FIGS. 8A, 8B and 8C are graphs showing various aberrations of the zoom lens system according to Example 4 upon focusing on infinity, in which FIG. 8A shows a wide-angle end state, FIG. 8B shows an intermediate focal length state, and FIG. 8C shows a telephoto end state.

FIGS. 10A, 10B and 10C are graphs showing various aberrations of the zoom lens system according to Example 5 upon focusing on infinity, in which FIG. 10A shows a wide-angle end state, FIG. 10B shows an intermediate focal length state, and FIG. 10C shows a telephoto end state.

FIGS. 11A and 11B are diagrams showing an electronic still camera which is equipped with a zoom lens system according to Example 1 of the present embodiment, in which FIG. 11A is a front view and FIG. 11B is a rear view.

DETAILED DESCRIPTION OF THE MOST PREFERRED EMBODIMENT

Figure 1:
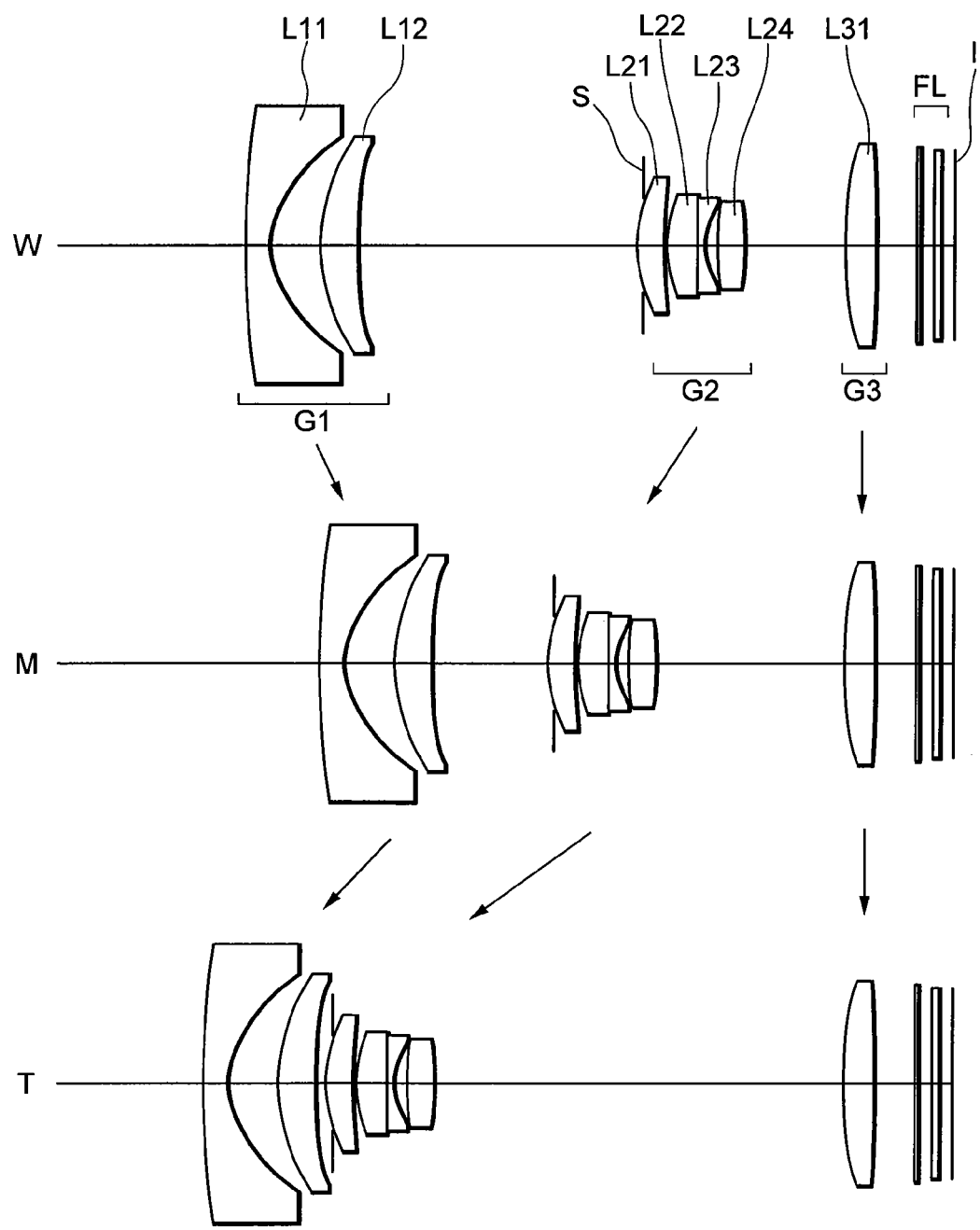
FIG. 1 is a diagram showing a lens configuration of a zoom lens system according to Example 1 of the present embodiment.

A zoom lens system according to the present embodiment is going to be explained below.

A zoom lens system according to the present embodiment, which is a negative-leading type zoom lens, comprises, in order from an object along an optical axis, a first lens group having negative refractive power, a second lens group having positive refractive power, and a third lens group having positive refractive power. Upon zooming from a wide-angle end state to a telephoto end state, each distance between lens groups is varied. The second lens group that varies focal length of the zoom lens system is a master lens group, and the first lens group is a compensator lens group. The third lens group optimizes a position of an exit pupil of the zoom lens system with respect to an imaging device, and corrects residual aberration left uncorrected by the first lens group and the second lens group.

In a zoom lens system according to the present embodiment, the following conditional expression (1) is satisfied:

$$0.44 < (Nnav - 0.80) \times ft \times \tan \omega w / TLw < 0.90 \quad (1)$$

where Nnav denotes an average of refractive indices at d-line (wave length $\lambda = 587.6$ nm) of all negative lenses included in the zoom lens system, ft denotes a focal length of the zoom lens system in the telephoto end state, $\omega w$ denotes a half angle of view of the zoom lens system in the wide-angle end state, and TLw denotes a total lens length of the zoom lens system in the wide-angle end state.

Conditional expression (1) is for excellently correcting curvature of a sagittal image plane that tends to become a problem upon making a wide-angle zoom lens compact. When a half angle of view $\omega W$ in the wide-angle end state is widened, a high order curvature of the sagittal image plane generally increases. This tendency becomes conspicuous as making the zoom lens system more compact, or correcting distortion more excellently, so that it becomes difficult to excellently secure peripheral imaging performance.

When the value (Nnav−0.80)×ft×tan $\omega w$/TLw is equal to or falls below the lower limit of conditional expression (1), curvature of the sagittal image plane increases in the wide-angle end state, and peripheral imaging performance decreases, so that it is undesirable. On the other hand, when the value (Nnav−0.80)×ft×tan $\omega w$/TLw is equal to or exceeds the upper limit of conditional expression (1), Petzval sum increases, and it becomes difficult to simultaneously correct curvature of field and astigmatic difference in the telephoto end state, so that it is undesirable.

With satisfying conditional expression (1), it becomes possible to excellently correct aberrations with keeping the total lens length of the zoom lens system compact.

In order to secure the effect of the present embodiment, it is preferable to set the lower limit of conditional expression (1) to 0.45. In order to further secure the effect of the present embodiment, it is most preferable to set the lower limit of conditional expression (1) to 0.47. In order to secure the effect of the present embodiment, it is preferable to set the upper limit of conditional expression (1) to 0.80. In order to further secure the effect of the present embodiment, it is most preferable to set the upper limit of conditional expression (1) to 0.75.

In a zoom lens system according to the present embodiment, it is preferable that upon zooming from the wide-angle end state to the telephoto end state, at least the first lens group and the second lens group are moved such that a distance between the first lens group and the second lens group decreases, and a distance between the second lens group and the third lens group increases. With this configuration, it becomes possible to easily construct the zoom lens system to be a high zoom ratio.

In a zoom lens system according to the present embodiment, the following conditional expression (2) is preferably satisfied:

$$0.30 < |ft \times L12t / f1| < 2.00 \quad (2)$$

where L12t denotes a distance between the most image side lens surface of the first lens group and the most object side lens surface of the second lens group in the telephoto end state, and f1 denotes a focal length of the first lens group.

Conditional expression (2) defines an appropriate range of the distance between the most image side lens surface of the first lens group and the most object side lens surface of the second lens group in the telephoto end state.

When the value ft×L12t/|f1| is equal to or falls below the lower limit of conditional expression (2), the most image side lens surface of the first lens group and the most object side lens surface of the second lens group come close to each other in the telephoto end state. Accordingly, there is a danger for the surfaces to come into contact with each other by fabrication errors, so that it is undesirable. Moreover, Petzval sum becomes large, and it becomes difficult to simultaneously correct curvature of field and astigmatic difference in the telephoto end state, so that it is undesirable. On the other hand, when the value ft×L12t/|f1| is equal to or exceeds the upper limit of conditional expression (2), the total lens length of the zoom lens system becomes excessively large. When such zoom lens system is forcibly made to be compact, it becomes difficult to correct upper coma in the intermediate focal length state, so that it is undesirable.

With satisfying conditional expression (2), it becomes possible to excellently correct aberrations with keeping the total lens length of the zoom lens system compact.

In order to secure the effect of the present embodiment, it is preferable to set the lower limit of conditional expression (2) to 0.40. In order to further secure the effect of the present embodiment, it is most preferable to set the lower limit of conditional expression (2) to 0.50. In order to secure the effect of the present embodiment, it is preferable to set the upper limit of conditional expression (2) to 1.80. In order to further secure the effect of the present embodiment, it is most preferable to set the upper limit of conditional expression (2) to 1.60.

In a zoom lens system according to the present embodiment, the following conditional expressions (3) and (4) are preferably satisfied:

$$0.21 < ft \times |X2|/TLw^2 < 0.30 \quad (3)$$

$$0.43 < L23w/f2 < 0.80 \quad (4)$$

where X2 denotes the maximum moving amount of the second lens group upon zooming from the wide-angle end state to the telephoto end state, L23w denotes a distance along the optical axis between the most image side lens surface of the second lens group and the most object side lens surface of the third lens group in the wide-angle end state, and f2 denotes a focal length of the second lens group.

Conditional expression (3) defines an appropriate range of the moving amount of the second lens group upon zooming from the wide-angle end state to the telephoto end state.

When the value ft×|X2|/TLw² is equal to or falls below the lower limit of conditional expression (3), the total lens length of the zoom lens system in the wide-angle end state and the diameter of the front lens become excessively large. Moreover, it becomes difficult to correct variation in lateral chromatic aberration and curvature of field upon zooming, so that it is undesirable. On the other hand, when the value ft×|X2|/TLw² is equal to or exceeds the upper limit of conditional expression (3), the total lens length of the zoom lens system becomes excessively large in the telephoto end state. Moreover, it becomes difficult to correct variation in spherical aberration with respect to wavelength in the telephoto end state, so that it is undesirable.

With satisfying conditional expression (3), it becomes possible to excellently correct aberrations with keeping the total lens length of the zoom lens system compact.

In order to secure the effect of the present embodiment, it is preferable to set the lower limit of conditional expression (3) to 0.22. In order to further secure the effect of the present embodiment, it is most preferable to set the lower limit of conditional expression (3) to 0.23. In order to secure the effect of the present embodiment, it is preferable to set the upper limit of conditional expression (3) to 0.29. In order to further secure the effect of the present embodiment, it is most preferable to set the upper limit of conditional expression (3) to 0.27.

Conditional expression (4) defines the distance along the optical axis between the most image side lens surface of the second lens group and the most object side lens surface of the third lens group in the wide-angle end state. When the ratio L23w/f2 is equal to or falls below the lower limit of conditional expression (4), it becomes difficult to correct curvature of sagittal image plane in the wide-angle end state, so that it is undesirable. On the other hand, when the ratio L23w/f2 is equal to or exceeds the upper limit of conditional expression (4), the back focal length becomes too short, so that it is undesirable. Moreover, lateral chromatic aberration in the wide-angle end state becomes worse.

By satisfying conditional expression (4), it becomes possible to excellently correct aberrations.

In order to secure the effect of the present embodiment, it is preferable to set the lower limit of conditional expression (4) to 0.44. In order to further secure the effect of the present embodiment, it is most preferable to set the lower limit of conditional expression (4) to 0.45. In order to secure the effect of the present embodiment, it is preferable to set the upper limit of conditional expression (4) to 0.70. In order to further secure the effect of the present embodiment, it is most preferable to set the upper limit of conditional expression (4) to 0.65.

In a zoom lens system according to the present embodiment, it is preferable that the second lens group includes, in order from the image along the optical axis, a positive lens, an air space along the optical axis, and a negative lens, and the following conditional expressions (5) and (6) are preferably satisfied:

$$0.36 < Nn - Np < 0.80 \quad (5)$$

$$3.00 < Nn + 0.05 \times vn \quad (6)$$

where Nn denotes refractive index of the negative lens in the second lens group at d-line (wavelength $\lambda$=587.6 nm), Np denotes refractive index of the positive lens in the second lens group at d-line (wavelength $\lambda$=587.6 nm), and vn denotes Abbe number of the negative lens in the second lens group at d-line (wavelength $\lambda$=587.6 nm).

With configuring the second lens group, in order from the image along the optical axis, a positive lens, an air space, and a negative lens, it becomes easy to correct curvature of the sagittal image plane in the wide-angle end state.

Conditional expression (5) defines an appropriate range of difference between refractive index of the positive lens and that of the negative lens disposed to the image side of the second lens group.

When the value Nn−Np is equal to or falls below the lower limit of conditional expression (5), curvature of the sagittal image plane in the wide-angle end state becomes large, and imaging performance on the periphery of the image becomes worse, so that it is undesirable. On the other hand, when the value Nn−Np is equal to or exceeds the upper limit of conditional expression (5), Petzval sum becomes extremely large, and it becomes difficult to simultaneously correct curvature of field and astigmatic difference in the telephoto end state, so that it is undesirable.

With satisfying conditional expression (5), it becomes possible to excellently correct aberrations.

In order to secure the effect of the present embodiment, it is preferable to set the lower limit of conditional expression (5) to 0.38. In order to further secure the effect of the present embodiment, it is most preferable to set the lower limit of conditional expression (5) to 0.40. In order to secure the effect of the present embodiment, it is preferable to set the upper limit of conditional expression (5) to 0.75. In order to further secure the effect of the present embodiment, it is most preferable to set the upper limit of conditional expression (5) to 0.70.

Conditional expression (6) defines an appropriate range of refractive index and Abbe number of the negative lens in the second lens group.

When the value Nn+0.05×vn is equal to or falls below the lower limit of conditional expression (6), it becomes difficult to simultaneously correct longitudinal chromatic aberration and variation in spherical aberration with respect to wavelength in the telephoto end state, so that it is undesirable.

With satisfying conditional expression (6), it becomes possible to excellently correct aberrations.

In order to secure the effect of the present embodiment, it is preferable to set the lower limit of conditional expression (6) to 3.10. In order to further secure the effect of the present embodiment, it is most preferable to set the lower limit of conditional expression (6) to 3.20.

In a zoom lens system according to the present embodiment, it is preferable that the first lens group includes, in order from the object along the optical axis, at least one negative lens and a positive lens, and the following conditional expression (7) is preferably satisfied:

$$0.08 < N2av - N1av < 0.40 \quad (7)$$

where N2av denotes an average of refractive indices of all negative lenses included in the second lens group at d-line (wavelength $\lambda$=587.6 nm), and N1av denotes an average of refractive indices of all negative lenses included in the first lens group at d-line (wavelength $\lambda$=587.6 nm).

With adopting such lens configuration, it becomes possible to make the outer diameter of the first lens group compact, and to excellently correct distortion in the wide-angle end state and spherical aberration in the telephoto end state.

Conditional expression (7) defines an appropriate range of the relation between the average of refractive indices of all negative lenses included in the first lens group and the average of refractive indices of all negative lenses included in the second lens group.

When the value N2av−N1av is equal to or falls below the lower limit of conditional expression (7), it becomes difficult to correct curvature of sagittal image plane in the wide-angle end state, so that it is undesirable. On the other hand, when the value N2av−N1av is equal to or exceeds the upper limit of conditional expression (7), it becomes difficult to correct distortion in the wide-angle end state, so that it is undesirable.

With satisfying conditional expression (7), excellent correction of aberration can be attained.

In order to secure the effect of the present embodiment, it is preferable to set the lower limit of conditional expression (7) to 0.11. In order to further secure the effect of the present embodiment, it is most preferable to set the lower limit of conditional expression (7) to 0.13. In order to secure the effect of the present embodiment, it is preferable to set the upper limit of conditional expression (7) to 0.32. In order to further secure the effect of the present embodiment, it is most preferable to set the upper limit of conditional expression (7) to 0.27.

In a zoom lens system according to the present embodiment, it is preferable that at least one lens surface of the negative lens in the first lens group is an aspherical surface. Moreover, the negative lens disposed to the most object side of the first lens group is preferably an aspherical lens having refractive power in the periphery weaker than the central portion. With this configuration, it becomes possible to excellently correct distortion in the wide-angle end state.

In a zoom lens system according to the present embodiment, it is preferable that the second lens group consists of, in order from the object along the optical axis, two positive lenses, a negative lens, and a positive lens. With configuring the second lens group in this manner, it becomes possible to shorten the back focal length, and to make the zoom lens system compact. Moreover, spherical aberration in the telephoto end state and upper coma can be excellently corrected. Furthermore, in order from the object along the optical axis, with cementing the second positive lens and the negative lens with each other, the effect of mutual decentering can be mitigated, so that it is more desirable.

In a zoom lens system according to the present embodiment, it is preferable that at least one surface of the most object side positive lens in the second lens group is an aspherical surface. With configuring the most object side positive lens as an aspherical lens, spherical aberration can be corrected excellently.

In a zoom lens system according to the present embodiment, focusing from infinity to a close object may be carried out by moving the first lens group or the third lens group to the object side. However, when the first lens group is moved to the object side, light amount on the periphery of the image frame tends to fall off at the closest image-taking range. Accordingly, focusing is preferably carried out by moving the third lens group to the object side.

In a zoom lens system according to the present embodiment, any lens surface may be a diffractive surface. Moreover, any lens may be a graded index lens (GRIN lens) or a plastic lens. A lens group having weak refractive power or a lens group having weak power with an aspherical surface may be disposed to the image side of the third lens group.

Each example according to the present embodiment is explained below with reference to accompanying drawings.

EXAMPLE 1

FIG. 1 is a diagram showing a lens configuration of a zoom lens system according to Example 1 of the present embodiment.

The zoom lens system according to Example 1 is composed of, in order from an object along an optical axis, a first lens group G1 having negative refractive power, a second lens group G2 having positive refractive power, and a third lens group G3 having positive refractive power. Upon zooming from a wide-angle end state W to a telephoto end state T, the first lens group G1 and the second lens group G2 are moved, and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive meniscus lens L12 having a convex surface facing the object. The image plane I side of the negative meniscus lens L11 is an aspherical surface.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31.

An aperture stop S is disposed to the image plane I side of the vertex on the optical axis of the first positive lens L21 locating to the most object side of the second lens group G2, and moved in a body with the second lens group G2 upon zooming from the wide-angle end state W to the telephoto end state T.

Filter group LF is composed of a low-pass filter, an infrared light blocking filter, and the like.

Various values associated with the zoom lens system according to Example 1 are listed in Table 1.

In [Lens Data], the first column shows the lens surface number counted in order from the object side, the second column "r" shows a radius of curvature of the lens surface, the third column "d" shows a distance to the next lens surface along the optical axis, the fourth column "nd" shows refractive index of the medium at d-line (wavelength $\lambda$=587.6 nm), and the fifth column "vd" shows Abbe number of the medium at d-line (wavelength $\lambda$=587.6 nm). In the second column "r", "r=∞" denotes a plane surface. Refractive index of the air nd=1.000000 is omitted.

In [Aspherical Data], an aspherical surface is exhibited by the following expression:

$$X(y)=(y^2/r)/\{1+(1-\kappa\cdot(y^2/r^2))^{1/2}\}+A4\cdot y^4+A6\cdot y^6+A8\cdot y^8+A10\cdot y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), K denotes a conical coefficient, and An denotes aspherical coefficient of n-th order. In [Aspherical Data], "E-n" (n: integer) denotes "×10$^{-n}$". For example, "1.234E-05" denotes "1.234×10$^{-5}$". The position of an aspherical surface is expressed by attaching "*" to the right side of the surface number and a radius of curvature of a reference sphere is shown in the second column "r".

In [Specifications], f denotes a focal length, W denotes a wide-angle end state, M denotes an intermediate focal length state, T denotes a telephoto end state, Bf denotes a back focal length, FNO denotes an f-number, and ω denotes a half angle of view (unit: degree), Y denotes an image height, TL denotes a total lens length of the zoom lens system, and Bf denotes a back focal length.

In [Variable Distances], values for respective variable distances with respect to wide-angle end state W, intermediate focal length state M, and telephoto end stat T are shown.

In [Lens Group Data], a starting surface number "i" and a focal length of each lens group are shown.

In [Values for Conditional Expressions], respective values with respect to conditional expressions are shown.

In the tables for various values, unless otherwise specified, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Lens Data]

| | r | d | nd | vd |
|---|---|---|---|---|
| 1 | 51.6817 | 1.2000 | 1.801390 | 45.46 |
| 2* | 4.6546 | 2.4500 | | |
| 3 | 9.4043 | 1.8000 | 1.846660 | 23.78 |
| 4 | 21.4805 | (d4) | | |
| 5 | ∞ | −0.4000 | Aperture Stop S | |
| 6* | 5.9519 | 1.4000 | 1.791120 | 45.21 |
| 7 | 46.7559 | 0.1000 | | |
| 8 | 5.3290 | 1.5500 | 1.719990 | 50.24 |
| 9 | −6438.2656 | 0.4000 | 2.003300 | 28.27 |
| 10 | 3.6201 | 0.6000 | | |
| 11 | 19.9676 | 1.3500 | 1.487490 | 70.45 |
| 12 | −11.7764 | (d12) | | |
| 13 | 15.6366 | 1.4500 | 1.603000 | 65.47 |
| 14 | −160.2862 | (d14) | | |
| 15 | ∞ | 0.2500 | 1.516800 | 64.12 |
| 16 | ∞ | 0.5000 | | |
| 17 | ∞ | 0.5000 | 1.516800 | 64.12 |
| 18 | ∞ | Bf | | |

[Aspherical Data]
Surface Number: 2

K = 0.1357
A4 = 2.18810E−04
A6 = 4.59650E−06
A8 = −1.60600E−07
A10 = 2.54210E−09

Surface Number: 6

K = 0.6029
A4 = −2.73040E−05
A6 = 2.26030E−07
A8 = 0.00000E+00
A10 = 0.00000E+00

| | W | M | T |
|---|---|---|---|

[Specifications]
Zoom Ratio: 3.7669

| | | | |
|---|---|---|---|
| f = | 5.15 | 9.30 | 19.40 |
| FNO = | 2.82 | 3.76 | 6.07 |
| ω = | 38.51 | 22.97 | 11.30 |
| Y = | 3.9 | 3.9 | 3.9 |
| TL = | 34.97703 | 31.38235 | 37.03794 |
| Bf = | 0.60000 | 0.60000 | 0.60000 |

[Variable Distances]

| | | | |
|---|---|---|---|
| d4 | 14.15193 | 6.09446 | 0.88877 |
| d12 | 4.92724 | 9.39004 | 20.25130 |
| d14 | 2.14786 | 2.14786 | 2.14786 |

[Lens Group Data]

| Group | i | focal length |
|---|---|---|
| 1 | 1 | −11.52 |
| 2 | 6 | 10.00 |
| 3 | 13 | 23.70 |

[Values for Conditional Expressions]

| | |
|---|---|
| (1): (Nnav − 0.80) × ft × tanωw/TLw = | 0.48652 |
| (2): ft × L12t/\|f1\| = | 0.82310 |
| (3): ft × \|X2\|/TLw$^2$ = | 0.24300 |
| (4): L23w/f2 = | 0.49272 |

TABLE 1-continued

| | |
|---|---|
| (5): Nn − Np = | 0.51581 |
| (6): Nn + 0.05 × vn = | 3.41680 |
| (7): N2av − N1av = | 0.20191 |

Figure 2A:
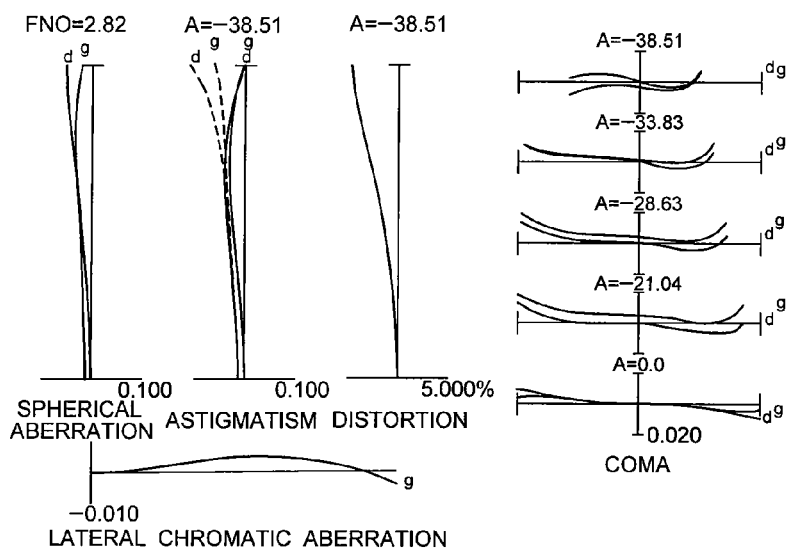
Figure 2B:
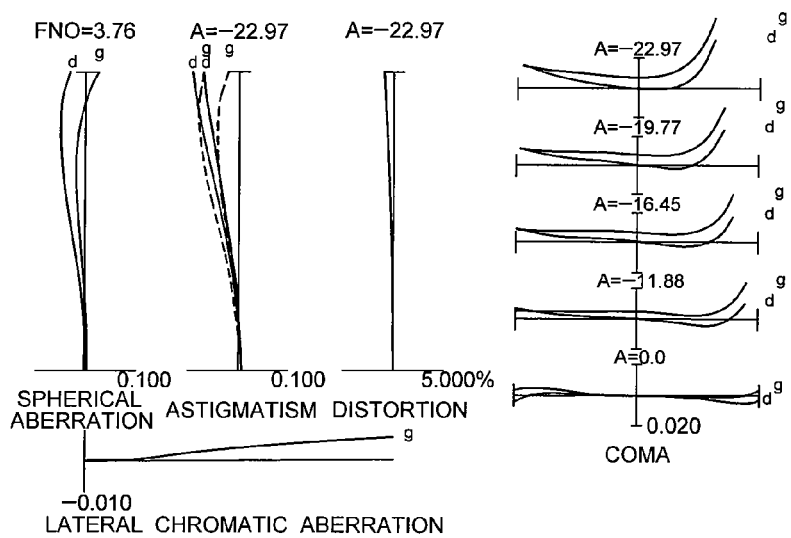
Figure 2C:
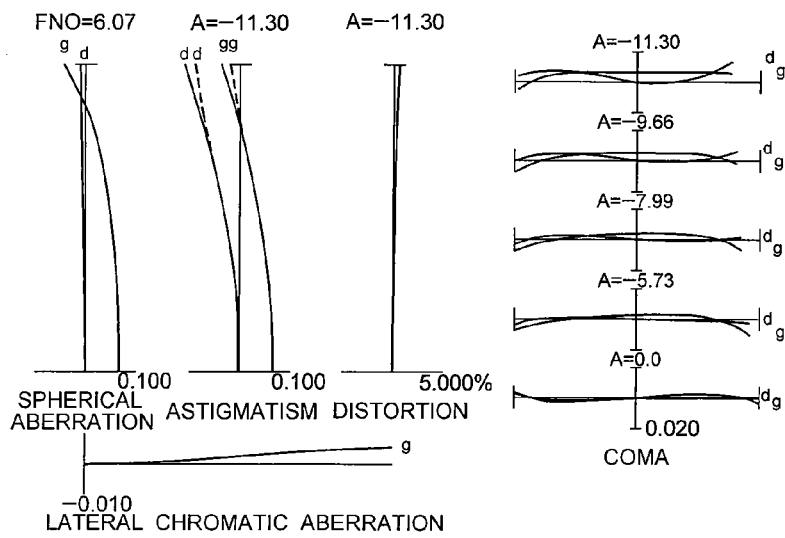

FIGS. 2A, 2B and 2C are graphs showing various aberrations of the zoom lens system according to Example 1 upon focusing on infinity, in which FIG. 2A shows a wide-angle end state, FIG. 2B shows an intermediate focal length state, and FIG. 2C shows a telephoto end state.

In respective graphs, FNO denotes an f-number, A denotes a half angle of view. In graphs showing spherical aberration, the f-number with respect to the maximum diameter is shown. In graphs showing astigmatism and distortion, the maximum value of the half angle of view is shown. In graphs showing coma, each half angle of view is shown. Moreover, d denotes an aberration curve at d-line (wavelength λ=587.6 nm), g denotes an aberration curve at g-line (wavelength λ=435.6 nm. In the graph showing astigmatism, a solid line indicates a sagittal image plane, and a broken line indicates a meridional image plane. The above-described explanation regarding various aberration graphs is the same as the other examples.

As is apparent from the respective graphs, the zoom lens system according to Example 1 shows superb optical performance as a result of good corrections to various aberrations over entire zoom range from the wide-angle end state W to the telephoto end state T even in the state upon shifting.

EXAMPLE 2

Figure 3:
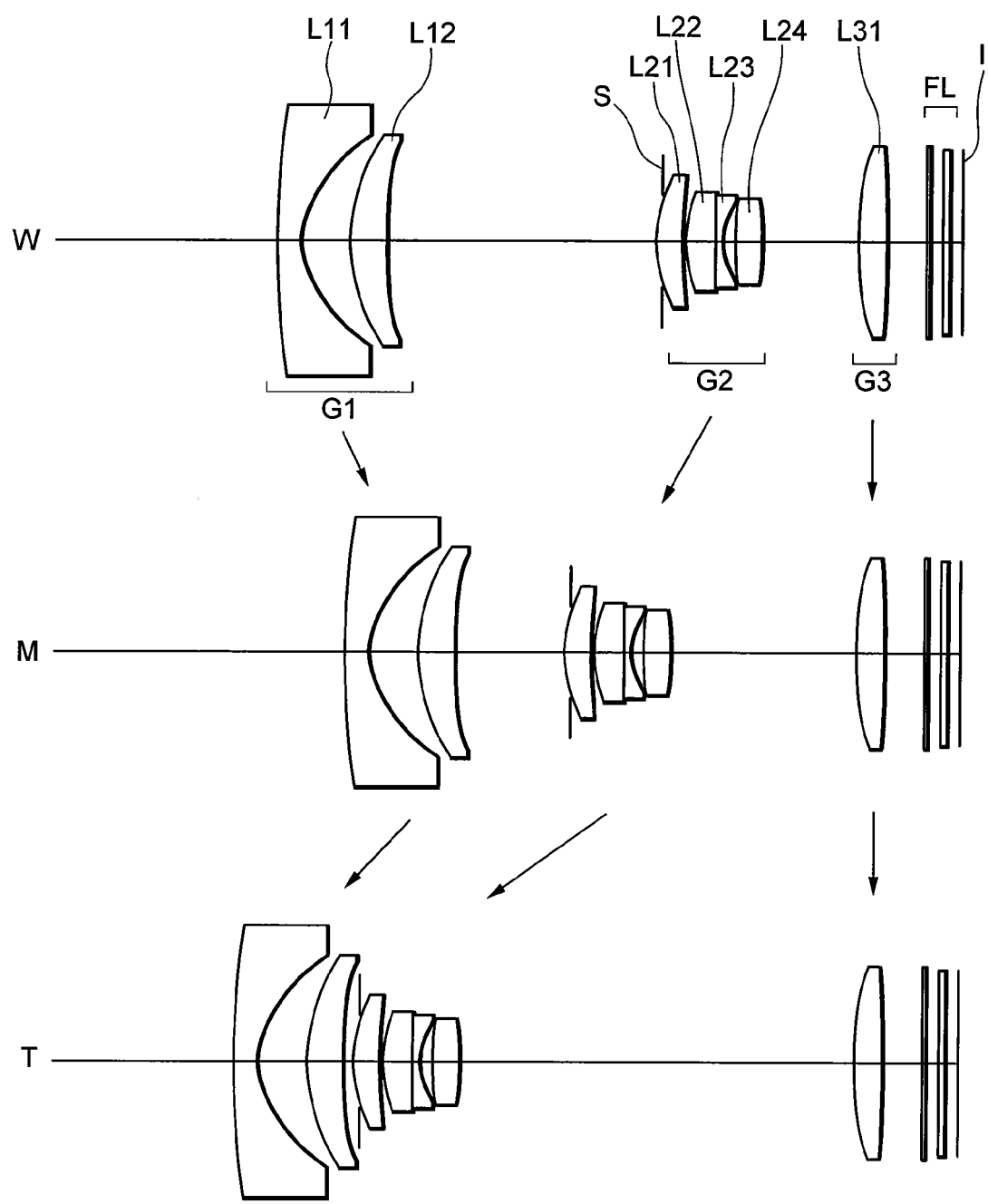
FIG. 3 is a diagram showing a lens configuration of a zoom lens system according to Example 2 of the present embodiment.

FIG. 3 is a diagram showing a lens configuration of a zoom lens system according to Example 2 of the present embodiment.

The zoom lens system according to Example 2 is composed of, in order from an object along an optical axis, a first lens group G1 having negative refractive power, a second lens group G2 having positive refractive power, a third lens group G3 having positive refractive power. Upon zooming from a wide-angle end state W to a telephoto end state T, the first lens group G1 and the second lens group G2 are moved, and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive meniscus lens L12 having a convex surface facing the object. The image plane I side lens surface of the negative meniscus lens L11 is an aspherical surface.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side surface of the first positive lens L21 is an aspherical surface.

The third lens group G3 is composed of a single positive lens L31.

An aperture stop S is disposed to the image plane I side of the vertex on the optical axis of the first positive lens L21 locating to the most object side of the second lens group G2, and moved in a body with the second lens group G2 upon zooming from the wide-angle end state W to the telephoto end state T.

Filter group LF is composed of a low-pass filter, an infrared light blocking filter, and the like.

Various values associated with the zoom lens system according to Example 2 are listed in Table 2.

TABLE 2

[Lens Data]

| | r | d | nd | vd |
|---|---|---|---|---|
| 1 | 43.1896 | 1.2000 | 1.864000 | 40.58 |
| 2* | 4.8257 | 2.4000 | | |
| 3 | 9.7250 | 1.7000 | 1.922860 | 20.88 |
| 4 | 21.3500 | (d4) | | |
| 5 | ∞ | −0.4000 | Aperture Stop S | |
| 6* | 6.0386 | 1.4000 | 1.796680 | 45.34 |
| 7 | 40.0500 | 0.1000 | | |
| 8 | 5.1698 | 1.5500 | 1.755000 | 52.29 |
| 9 | 20703.6520 | 0.4000 | 2.003300 | 28.27 |
| 10 | 3.5377 | 0.6000 | | |
| 11 | 21.6274 | 1.3500 | 1.487490 | 70.45 |
| 12 | −11.5997 | (d12) | | |
| 13 | 15.8730 | 1.4500 | 1.603000 | 65.47 |
| 14 | −127.5792 | (d14) | | |
| 15 | ∞ | 0.2500 | 1.516800 | 64.12 |
| 16 | ∞ | 0.5000 | | |
| 17 | ∞ | 0.5000 | 1.516800 | 64.12 |
| 18 | ∞ | Bf | | |

[Aspherical Data]
Surface Number: 2

K = 0.1229
A4 = 2.20150E−04
A6 = 4.96840E−06
A8 = −1.70780E−07
A10 = 2.65850E−09

Surface Number: 6

K = 0.0745
A4 = 2.69330E−04
A6 = 4.00600E−06
A8 = 0.00000E+00
A10 = 0.00000E+00

| | W | M | T |
|---|---|---|---|

[Specifications]
Zoom Ratio: 3.7669

| | | | |
|---|---|---|---|
| f = | 5.15 | 9.30 | 19.40 |
| FNO = | 2.80 | 3.73 | 6.02 |
| ω = | 38.50 | 22.96 | 11.30 |
| Y = | 3.9 | 3.9 | 3.9 |
| TL = | 34.52638 | 30.97667 | 36.53594 |
| Bf = | 0.60000 | 0.60000 | 0.60000 |

[Variable Distances]

| | | | |
|---|---|---|---|
| d4 | 13.97549 | 6.03311 | 0.90180 |
| d12 | 4.95223 | 9.34490 | 20.03549 |
| d14 | 1.99866 | 1.99866 | 1.99866 |

[Lens Group Data]

| Group | i | focal length |
|---|---|---|
| 1 | 1 | −11.45 |
| 2 | 6 | 9.85 |
| 3 | 13 | 23.50 |

[Values for Conditional Expressions]

| | |
|---|---|
| (1): (Nnav − 0.80) × ft × tanωw/TLw = | 0.50668 |
| (2): ft × L12t/|f1| = | 0.85021 |
| (3): ft × |X2|/TLw$^2$ = | 0.24547 |
| (4): L23w/f2 = | 0.50276 |
| (5): Nn − Np = | 0.51581 |
| (6): Nn + 0.05 × vn = | 3.41680 |
| (7): N2av − N1av = | 0.13930 |

Figure 4A:
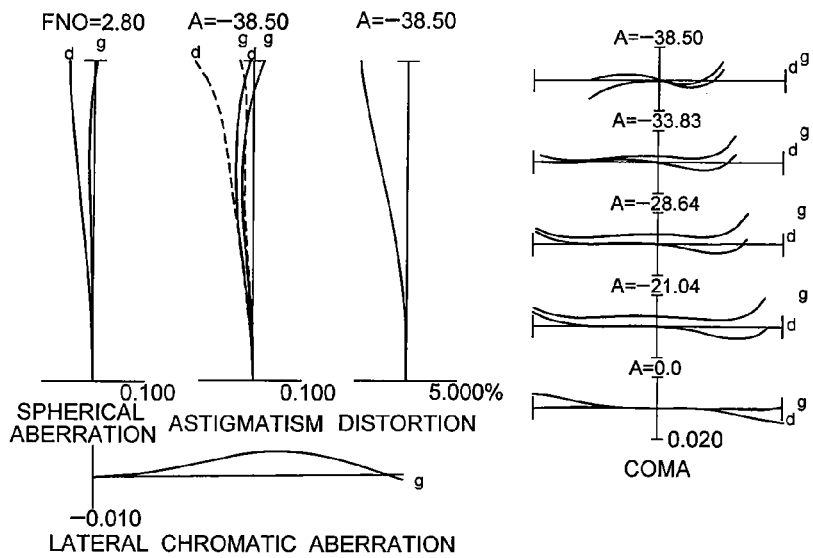
Figure 4B:
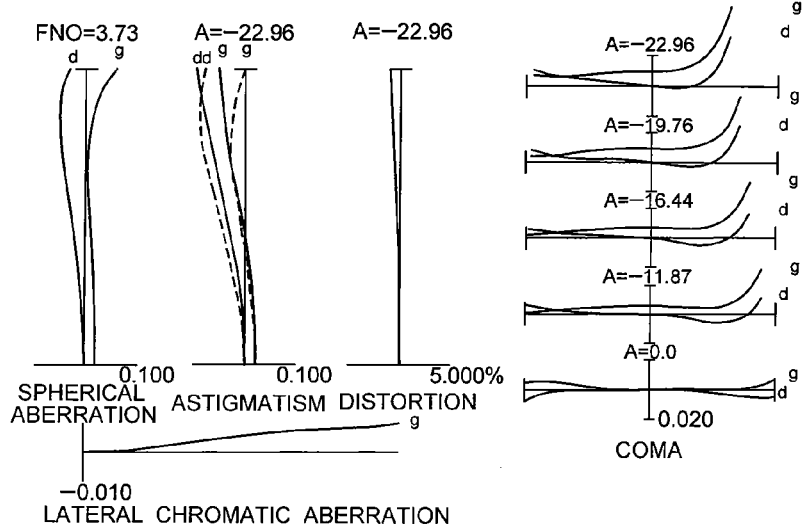
Figure 4C:
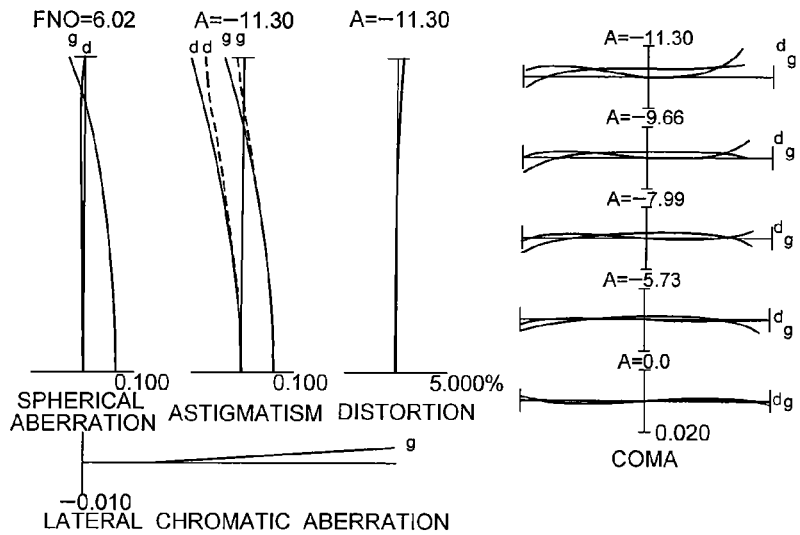

FIGS. 4A, 4B and 4C are graphs showing various aberrations of the zoom lens system according to Example 2 upon focusing on infinity, in which FIG. 4A shows a wide-angle end state, FIG. 4B shows an intermediate focal length state, and FIG. 4C shows a telephoto end state.

As is apparent from the respective graphs, the zoom lens system according to Example 2 shows superb optical performance as a result of good corrections to various aberrations over entire zoom range from the wide-angle end state W to the telephoto end state T even in the state upon shifting.

EXAMPLE 3

Figure 5:
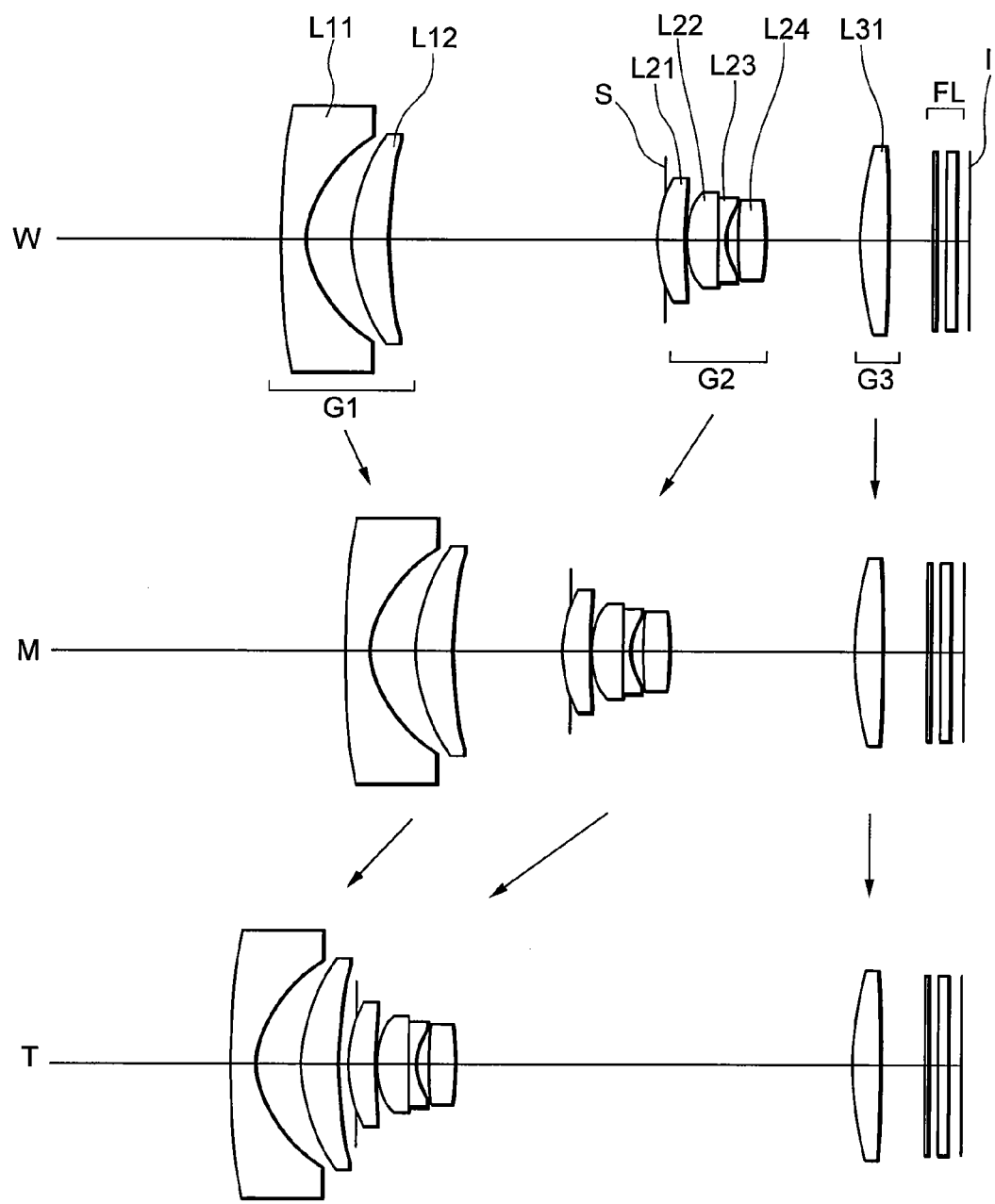
FIG. 5 is a diagram showing a lens configuration of a zoom lens system according to Example 3 of the present embodiment.

FIG. 5 is a diagram showing a lens configuration of a zoom lens system according to Example 3 of the present embodiment.

The zoom lens system according to Example 3 is composed of, in order from an object along an optical axis, a first lens group G1 having negative refractive power, a second lens group G2 having positive refractive power, a third lens group G3 having positive refractive power. Upon zooming from a wide-angle end state W to a telephoto end state T, the first lens group G1 and the second lens group G2 are moved, and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive meniscus lens L12 having a convex surface facing the object. The image plane I side lens surface of the negative meniscus lens L11 is an aspherical surface.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side surface of the first positive lens L21 is an aspherical surface.

The third lens group G3 is composed of a single positive lens L31.

An aperture stop S is disposed to the image plane I side of the vertex on the optical axis of the first positive lens L21 locating to the most object side of the second lens group G2, and moved in a body with the second lens group G2 upon zooming from the wide-angle end state W to the telephoto end state T.

Filter group LF is composed of a low-pass filter, an infrared light blocking filter, and the like.

Various values associated with the zoom lens system according to Example 3 are listed in Table 3.

TABLE 3

[Lens Data]

| | r | d | nd | vd |
|---|---|---|---|---|
| 1 | 45.3442 | 1.2000 | 1.820800 | 42.71 |
| 2* | 4.6299 | 2.3000 | | |
| 3 | 8.9263 | 1.8500 | 1.808095 | 22.76 |
| 4 | 21.3500 | (d4) | | |
| 5 | ∞ | −0.4000 | Aperture Stop S | |
| 6* | 6.4283 | 1.4000 | 1.796680 | 45.34 |
| 7 | 39.6174 | 0.1000 | | |
| 8 | 4.7885 | 1.5500 | 1.743200 | 49.32 |
| 9 | 115.2724 | 0.4000 | 2.003300 | 28.27 |
| 10 | 3.4894 | 0.6300 | | |
| 11 | 20.6163 | 1.3500 | 1.487490 | 70.45 |
| 12 | −11.6586 | (d12) | | |
| 13 | 18.1750 | 1.4500 | 1.603000 | 65.47 |
| 14 | −62.3851 | (d14) | | |
| 15 | ∞ | 0.2500 | 1.516800 | 64.12 |
| 16 | ∞ | 0.5000 | | |
| 17 | ∞ | 0.5000 | 1.516800 | 64.12 |
| 18 | ∞ | Bf | | |

[Aspherical Data]
Surface Number: 2

K = 0.1272
A4 = 2.77340E−04
A6 = 4.48680E−06
A8 = −1.29350E−07
A10 = 2.17550E−09
Surface Number: 2

K = 0.0479
A4 = 2.51360E−04
A6 = 3.47340E−06
A8 = 0.00000E+00
A10 = 0.00000E+00

| | W | M | T |
|---|---|---|---|
| [Specifications] Zoom Ratio: 3.7669 | | | |
| f = | 5.15 | 9.30 | 19.40 |
| FNO = | 2.80 | 3.74 | 6.02 |
| ω = | 38.50 | 22.97 | 11.32 |
| Y = | 3.9 | 3.9 | 3.9 |
| TL = | 34.70106 | 31.17432 | 36.81446 |
| Bf = | 0.60000 | 0.59999 | 0.60001 |
| [Variable Distances] | | | |
| d4 | 13.99846 | 6.04213 | 0.90180 |
| d12 | 4.85857 | 9.28816 | 20.06863 |
| d14 | 2.16404 | 2.16404 | 2.16404 |

[Lens Group Data]

| Group | i | focal length |
|---|---|---|
| 1 | 1 | −11.45 |
| 2 | 6 | 9.90 |
| 3 | 13 | 23.50 |

[Values for Conditional Expressions]

| | |
|---|---|
| (1): (Nnav − 0.80) × ft × tanωw/TLw = | 0.49453 |
| (2): ft × L12t/|f1| = | 0.85021 |
| (3): ft × |X2|/TLw² = | 0.24505 |
| (4): L23w/f2 = | 0.49076 |
| (5): Nn − Np = | 0.51581 |
| (6): Nn + 0.05 × νn = | 3.41680 |
| (7): N2av − N1av = | 0.18250 |

Figure 6A:
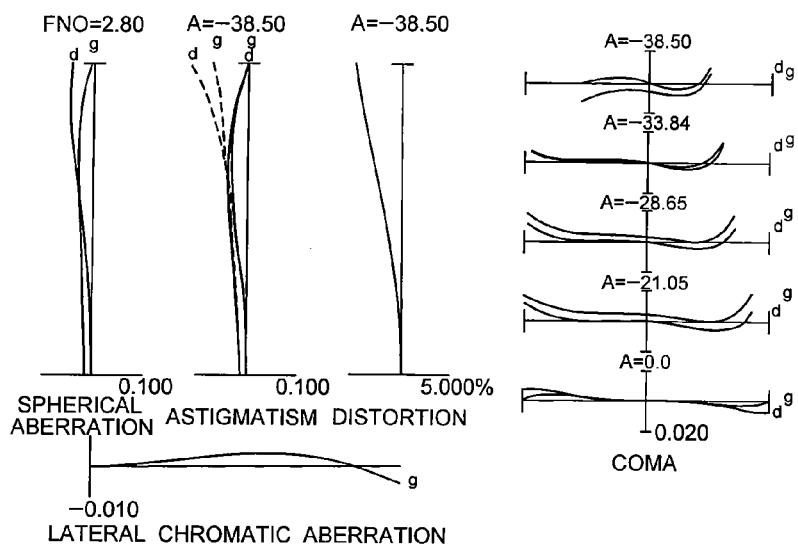
Figure 6B:
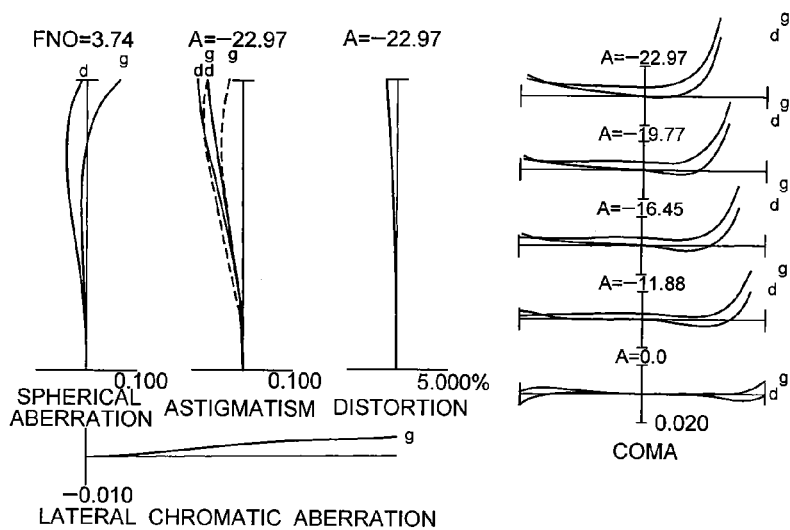
Figure 6C:
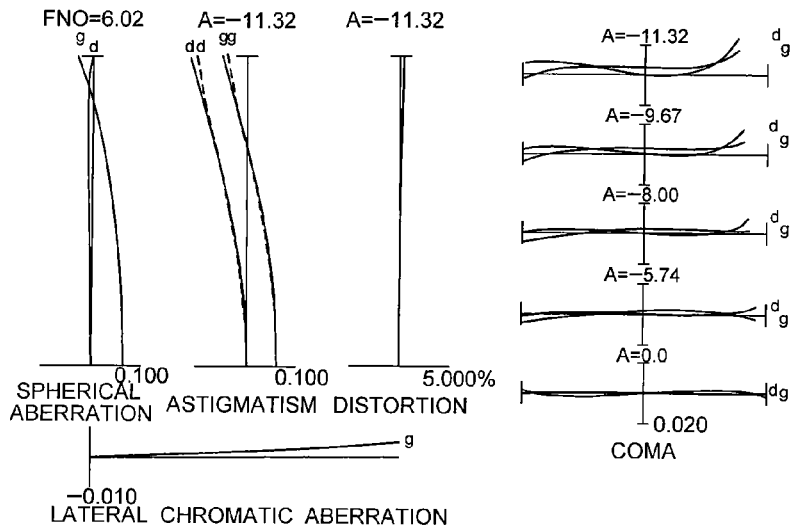

FIGS. 6A, 6B and 6C are graphs showing various aberrations of the zoom lens system according to Example 3 upon focusing on infinity, in which FIG. 6A shows a wide-angle end state, FIG. 6B shows an intermediate focal length state, and FIG. 6C shows a telephoto end state.

As is apparent from the respective graphs, the zoom lens system according to Example 3 shows superb optical performance as a result of good corrections to various aberrations over entire zoom range from the wide-angle end state W to the telephoto end state T even in the state upon shifting.

EXAMPLE 4

Figure 7:
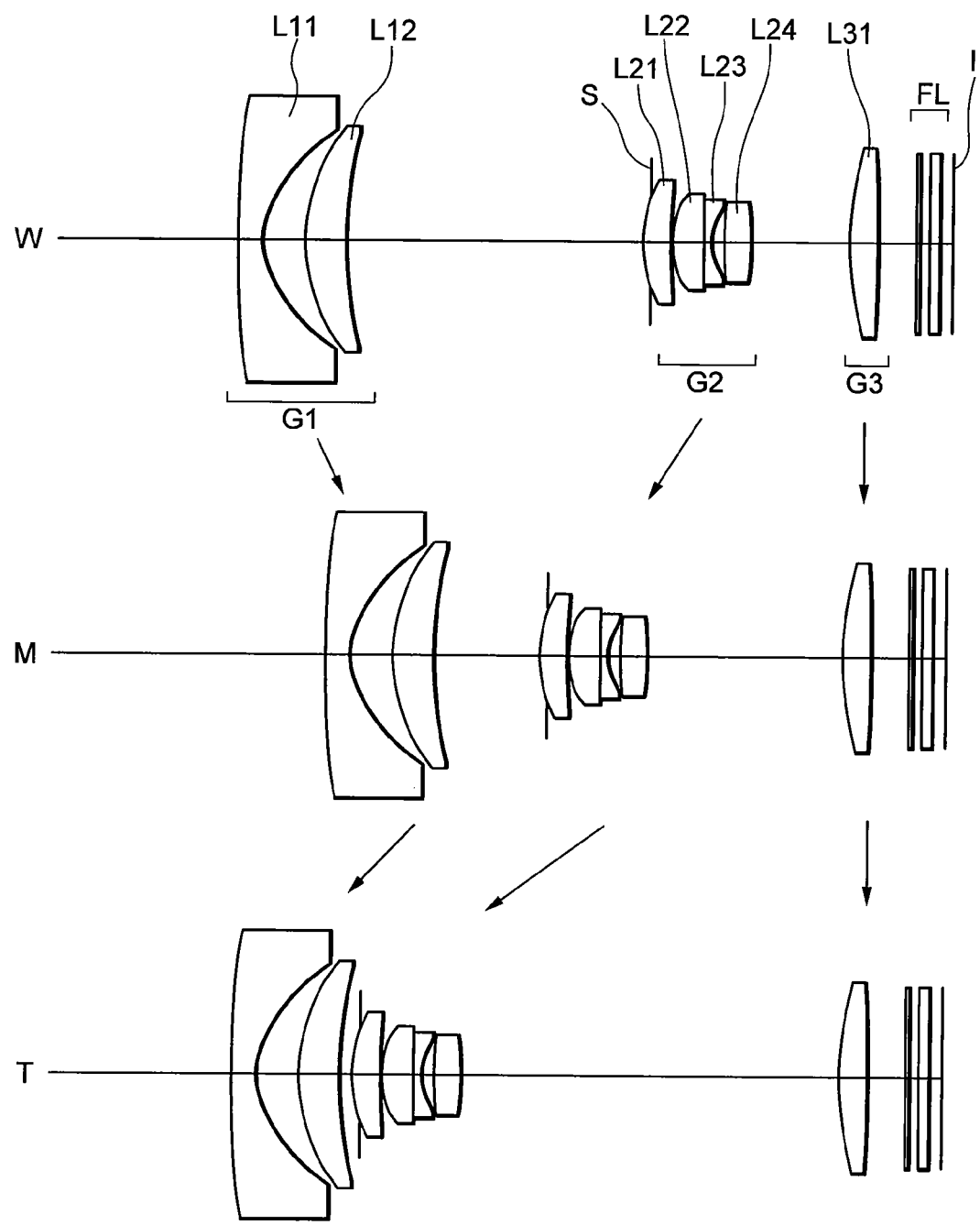
FIG. 7 is a diagram showing a lens configuration of a zoom lens system according to Example 4 of the present embodiment.

FIG. 7 is a diagram showing a lens configuration of a zoom lens system according to Example 4 of the present embodiment.

The zoom lens system according to Example 4 is composed of, in order from an object along an optical axis, a first lens group G1 having negative refractive power, a second lens group G2 having positive refractive power, a third lens group G3 having positive refractive power. Upon zooming from a wide-angle end state W to a telephoto end state T, the first lens group G1 and the second lens group G2 are moved, and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive meniscus lens L12 having a convex surface facing the object. The image plane I side lens surface of the negative meniscus lens L11 is an aspherical surface.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side surface of the first positive lens L21 is an aspherical surface.

The third lens group G3 is composed of a single positive lens L31.

An aperture stop S is disposed to the image plane I side of the vertex on the optical axis of the first positive lens L21 locating to the most object side of the second lens group G2, and moved in a body with the second lens group G2 upon zooming from the wide-angle end state W to the telephoto end state T.

Filter group LF is composed of a low-pass filter, an infrared light blocking filter, and the like.

Various values associated with the zoom lens system according to Example 4 are listed in Table 4.

TABLE 4

[Lens Data]

| | r | d | nd | νd |
|---|---|---|---|---|
| 1 | 52.1848 | 1.2000 | 1.820800 | 42.71 |
| 2* | 4.8368 | 2.1500 | | |
| 3 | 9.2127 | 2.0000 | 1.846660 | 23.78 |
| 4 | 23.1214 | (d4) | | |
| 5 | ∞ | −0.4000 | Aperture Stop S | |
| 6* | 6.4056 | 1.5000 | 1.768020 | 49.23 |
| 7 | ∞ | 0.1000 | | |
| 8 | 4.9076 | 1.5000 | 1.670000 | 57.36 |
| 9 | −41.4948 | 0.4000 | 1.903660 | 31.31 |
| 10 | 3.4963 | 0.6500 | | |
| 11 | 176.4834 | 1.3500 | 1.497820 | 82.56 |
| 12 | −11.8352 | (d12) | | |
| 13 | 15.0000 | 1.5000 | 1.603000 | 65.47 |
| 14 | −158.5718 | (d14) | | |
| 15 | ∞ | 0.2500 | 1.516800 | 64.12 |
| 16 | ∞ | 0.5000 | | |
| 17 | ∞ | 0.5000 | 1.516800 | 64.12 |
| 18 | ∞ | Bf | | |

[Aspherical Data]
Surface Number: 2

K = 0.1313
A4 = 2.29150E−04
A6 = 3.92470E−06
A8 = −8.39500E−08
A10 = 8.03290E−10
Surface Number: 6

K = −0.6468
A4 = 5.52540E−04
A6 = −4.16670E−08
A8 = 0.00000E+00
A10 = 0.00000E+00

TABLE 4-continued

| | W | M | T |
|---|---|---|---|
| [Specifications] | | | |
| Zoom Ratio: 3.7669 | | | |
| f = | 5.15 | 10.10 | 19.40 |
| FNO = | 2.78 | 3.84 | 5.83 |
| ω = | 38.49 | 21.18 | 11.27 |
| Y = | 3.9 | 3.9 | 3.9 |
| TL = | 35.77011 | 31.07895 | 35.55672 |
| Bf = | 0.60000 | 0.60000 | 0.60000 |
| [Variable Distances] | | | |
| d4 | 15.33659 | 5.70537 | 0.90180 |
| d12 | 4.80184 | 9.74190 | 19.02324 |
| d14 | 1.83168 | 1.83168 | 1.83168 |

[Lens Group Data]

| Group | i | focal length |
|---|---|---|
| 1 | 1 | −12.40 |
| 2 | 6 | 10.05 |
| 3 | 13 | 22.80 |

[Values for Conditional Expressions]

| | |
|---|---|
| (1): $(Nnav - 0.80) \times ft \times \tan\omega/TLw$ = | 0.45816 |
| (2): $ft \times L12t/|f1|$ = | 0.78507 |
| (3): $ft \times |X2|/TLw^2$ = | 0.21563 |
| (4): $L23w/f2$ = | 0.47780 |
| (5): $Nn - Np$ = | 0.40584 |
| (6): $Nn + 0.05 \times \nu n$ = | 3.46916 |
| (7): $N2av - N1av$ = | 0.08286 |

Figure 8A:
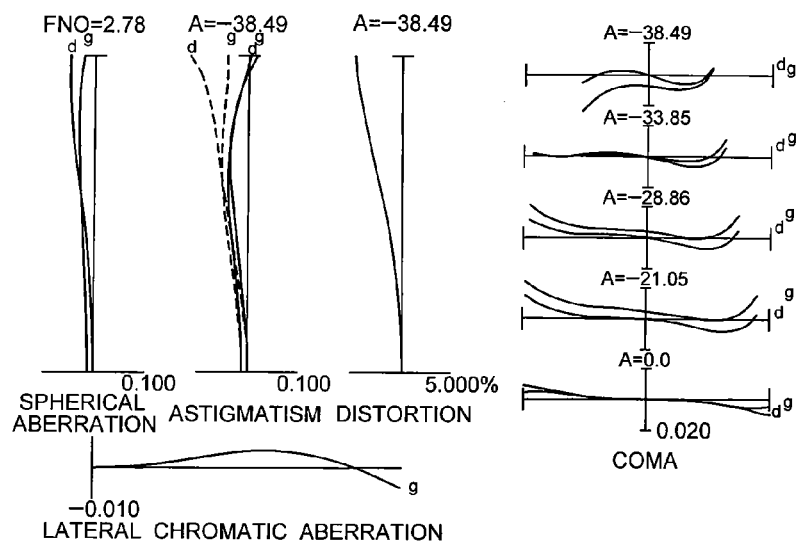
Figure 8B:
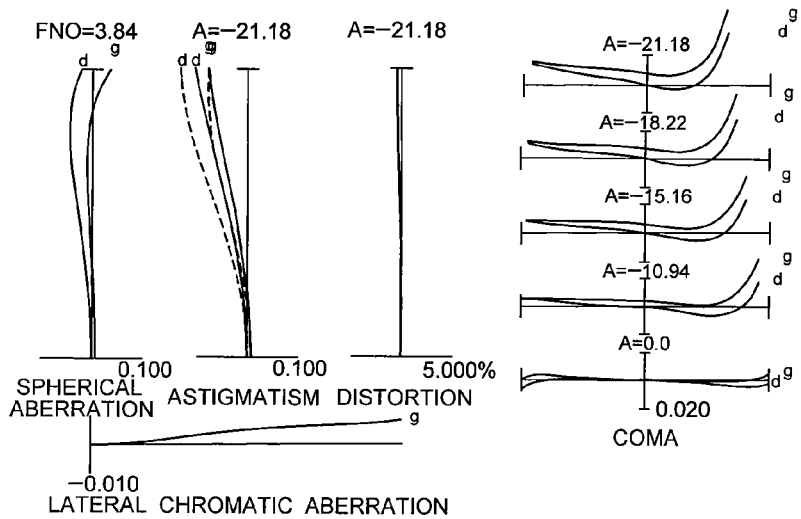
Figure 8C:
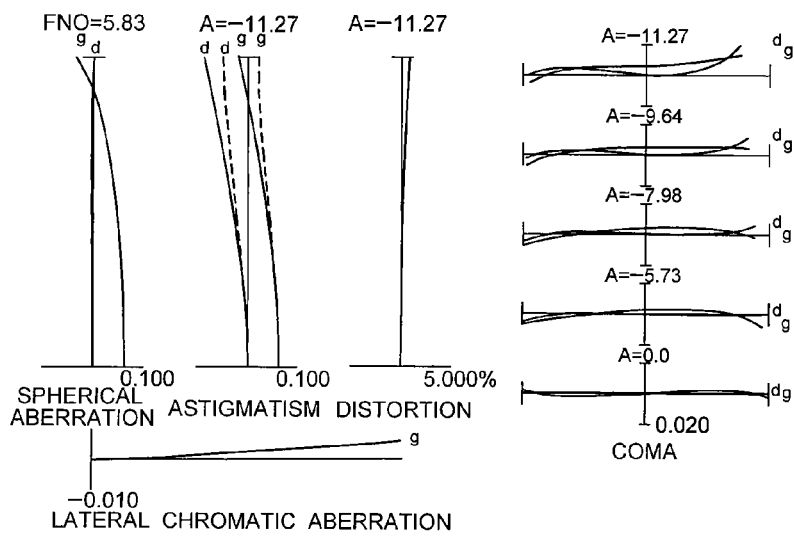

FIGS. 8A, 8B and 8C are graphs showing various aberrations of the zoom lens system according to Example 4 upon focusing on infinity, in which FIG. 8A shows a wide-angle end state, FIG. 8B shows an intermediate focal length state, and FIG. 8C shows a telephoto end state.

As is apparent from the respective graphs, the zoom lens system according to Example 4 shows superb optical performance as a result of good corrections to various aberrations over entire zoom range from the wide-angle end state W to the telephoto end state T even in the state upon shifting.

EXAMPLE 5

Figure 9:
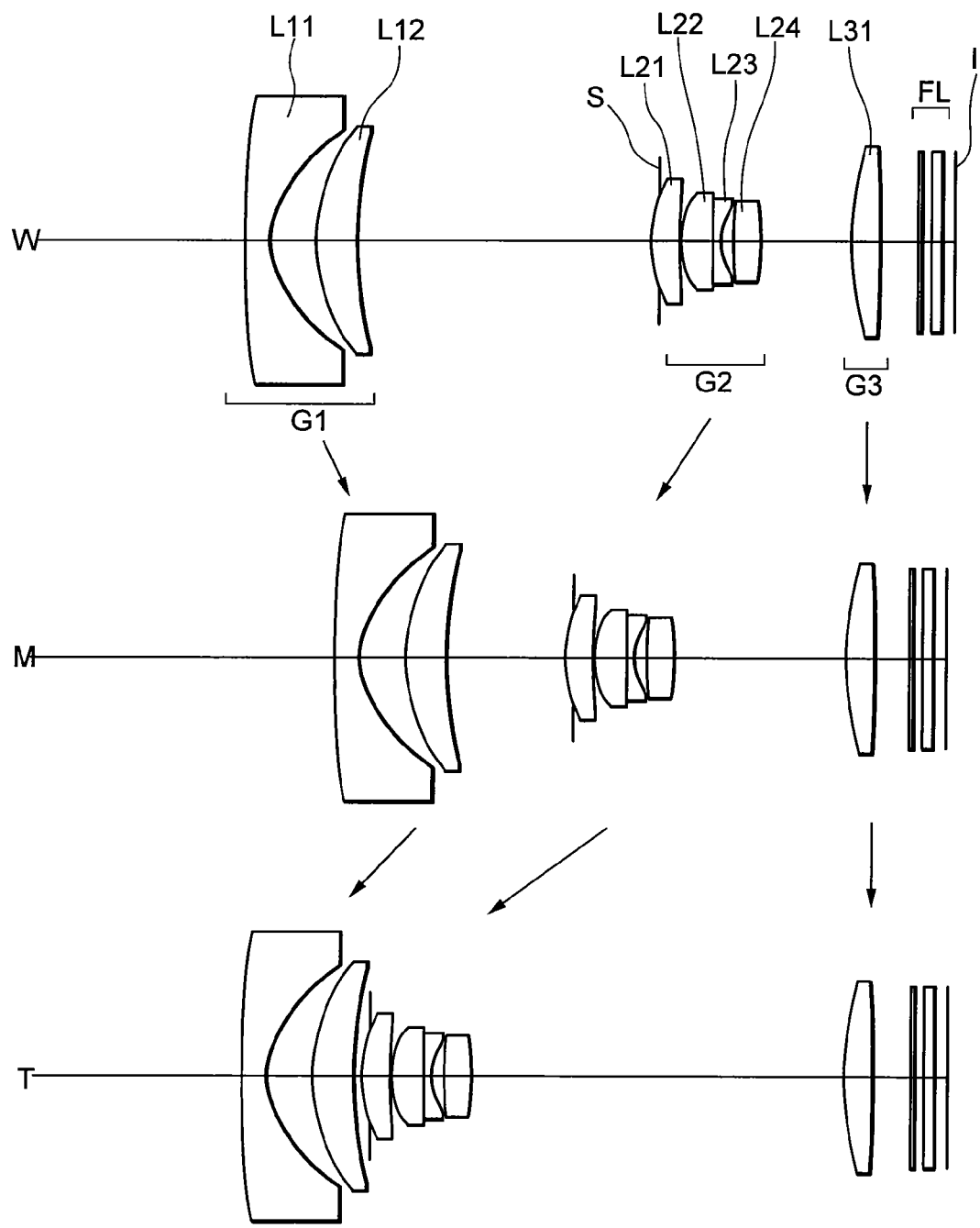
FIG. 9 is a diagram showing a lens configuration of a zoom lens system according to Example 5 of the present embodiment.

FIG. 9 is a diagram showing a lens configuration of a zoom lens system according to Example 5 of the present embodiment.

The zoom lens system according to Example 5 is composed of, in order from an object along an optical axis, a first lens group G1 having negative refractive power, a second lens group G2 having positive refractive power, a third lens group G3 having positive refractive power. Upon zooming from a wide-angle end state W to a telephoto end state T, the first lens group G1 and the second lens group G2 are moved, and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive meniscus lens L12 having a convex surface facing the object. The image plane I side lens surface of the negative meniscus lens L11 is an aspherical surface.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side surface of the first positive lens L21 is an aspherical surface.

The third lens group G3 is composed of a single positive lens L31.

An aperture stop S is disposed to the image plane I side of the vertex on the optical axis of the first positive lens L21 locating to the most object side of the second lens group G2, and moved in a body with the second lens group G2 upon zooming from the wide-angle end state W to the telephoto end state T.

Filter group LF is composed of a low-pass filter, an infrared light blocking filter, and the like.

Various values associated with the zoom lens system according to Example 5 are listed in Table 5.

TABLE 5

[Lens Data]

| | r | d | nd | vd |
|---|---|---|---|---|
| 1 | 56.9854 | 1.2000 | 1.801390 | 45.46 |
| 2* | 4.8951 | 2.3700 | | |
| 3 | 9.6794 | 1.8500 | 1.846660 | 23.78 |
| 4 | 22.8417 | (d4) | | |
| 5 | ∞ | −0.4000 | Aperture Stop S | |
| 6* | 5.6486 | 1.5000 | 1.768020 | 49.23 |
| 7 | −346.7867 | 0.1000 | | |
| 8 | 5.6601 | 1.5000 | 1.677900 | 55.43 |
| 9 | −19.1076 | 0.4000 | 1.903660 | 31.31 |
| 10 | 3.4949 | 0.6500 | | |
| 11 | 65.9223 | 1.3500 | 1.456000 | 91.20 |
| 12 | −11.7175 | (d12) | | |
| 13 | 14.5000 | 1.5500 | 1.517420 | 52.32 |
| 14 | −67.1976 | (d14) | | |
| 15 | ∞ | 0.2500 | 1.516800 | 64.12 |
| 16 | ∞ | 0.5000 | | |
| 17 | ∞ | 0.5000 | 1.516800 | 64.12 |
| 18 | ∞ | Bf | | |

[Aspherical Data]
Surface Number: 2

K = −1.1324
A4 = 1.52320E−03
A6 = −1.85570E−05
A8 = 2.49790E−07
A10 = −1.36910E−09
Surface Number: 6

K = −0.7302
A4 = 8.19440E−04
A6 = −1.48120E−06
A8 = 0.00000E+00
A10 = 0.00000E+00

| | W | M | T |
|---|---|---|---|
| [Specifications] | | | |
| Zoom Ratio: 3.7669 | | | |
| f = | 5.15 | 9.30 | 19.40 |
| FNO = | 2.80 | 3.70 | 5.92 |
| ω = | 38.50 | 22.88 | 11.29 |
| Y = | 3.9 | 3.9 | 3.9 |
| TL = | 35.35125 | 30.83483 | 35.28462 |
| Bf = | 0.60000 | 0.60000 | 0.60000 |
| [Variable Distances] | | | |
| d4 | 15.12029 | 6.48245 | 0.90180 |
| d12 | 4.52584 | 8.64726 | 18.67769 |
| d14 | 1.78512 | 1.78512 | 1.78512 |

[Lens Group Data]

| Group | i | focal length |
|---|---|---|

TABLE 5-continued

| 1 | 1 | −12.25 |
|---|---|---|
| 2 | 6 | 9.95 |
| 3 | 13 | 23.20 |

[Values for Conditional Expressions]

| (1): (Nnav − 0.80) × ft × tanωw/TLw = | 0.45938 |
|---|---|
| (2): ft × L12t/|f1| = | 0.79469 |
| (3): ft × |X2|/TLw$^2$ = | 0.21969 |
| (4): L23w/f2 = | 0.45486 |
| (5): Nn − Np = | 0.44766 |
| (6): Nn + 0.05 × vn = | 3.46916 |
| (7): N2av − N1av = | 0.10227 |

Figure 10A:
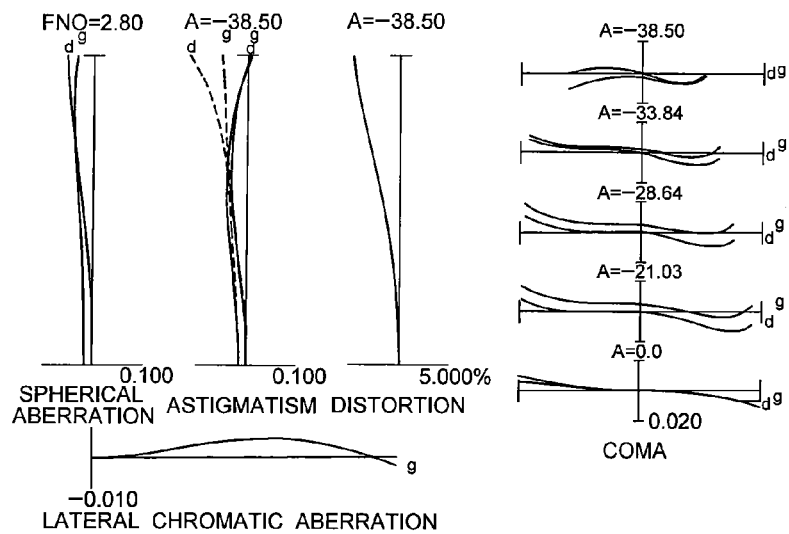
Figure 10B:
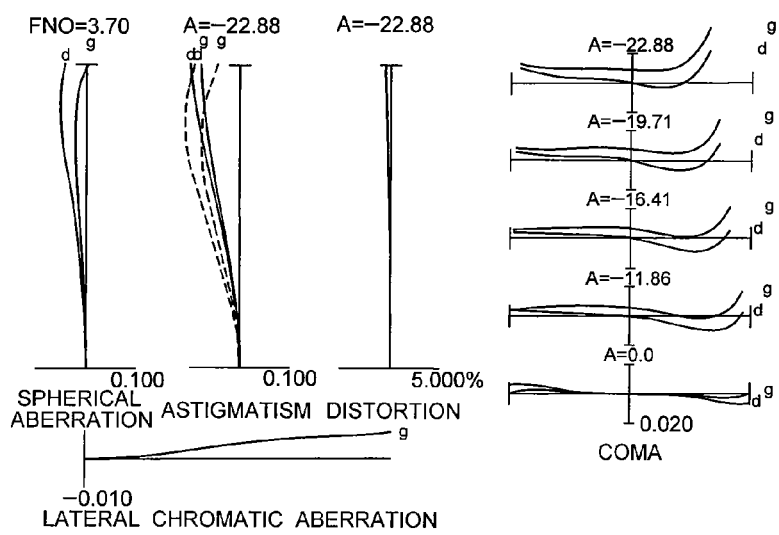
Figure 10C:
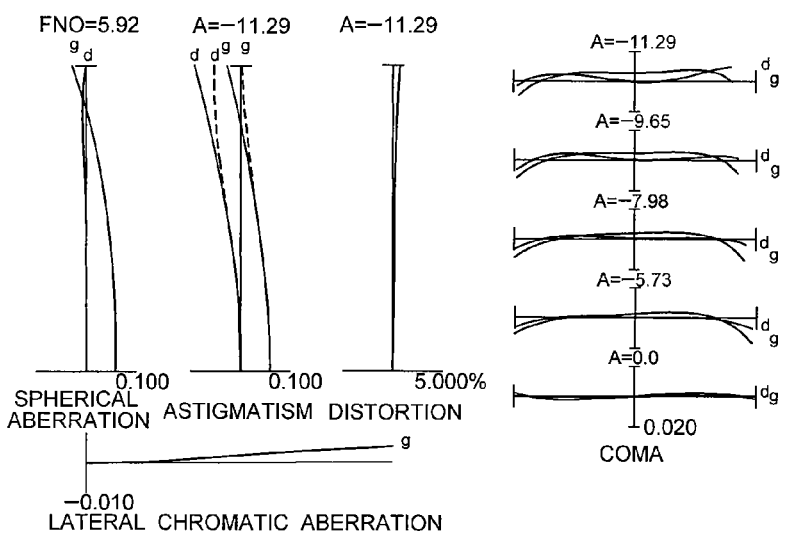

FIGS. 10A, 10B and 10C are graphs showing various aberrations of the zoom lens system according to Example 5 upon focusing on infinity, in which FIG. 10A shows a wide-angle end state, FIG. 10B shows an intermediate focal length state, and FIG. 10C shows a telephoto end state.

As is apparent from the respective graphs, the zoom lens system according to Example 5 shows superb optical performance as a result of good corrections to various aberrations over entire zoom range from the wide-angle end state W to the telephoto end state T even in the state upon shifting.

As described above, the present embodiment makes it possible to provide a zoom lens system having a high zoom ratio, compactness and high optical performance, capable of widening an angle of view in the wide-angle end state, and suitable for a solid-state imaging device.

Then, a camera equipped with the zoom lens system according to the present embodiment is explained below. Although a case that the zoom lens system according to Example 1 is installed is explained, the same performance can be obtained by the other Examples.

Figure 11A:
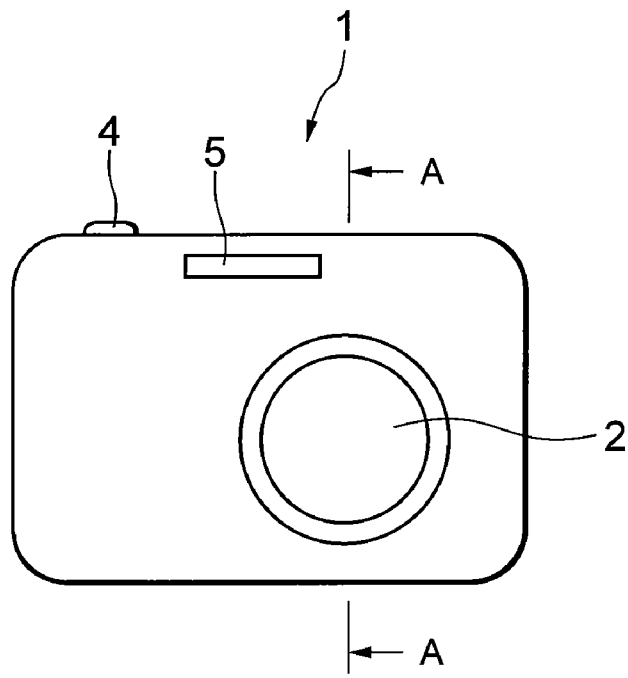
Figure 11B:
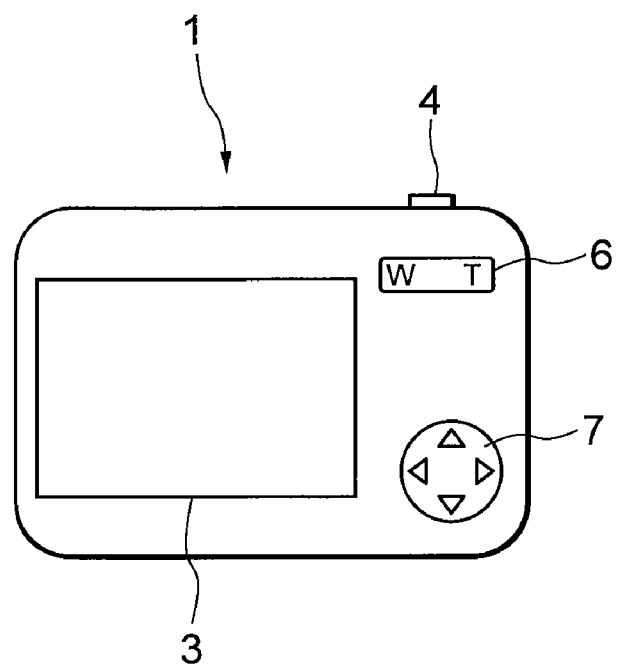
Figure 12:
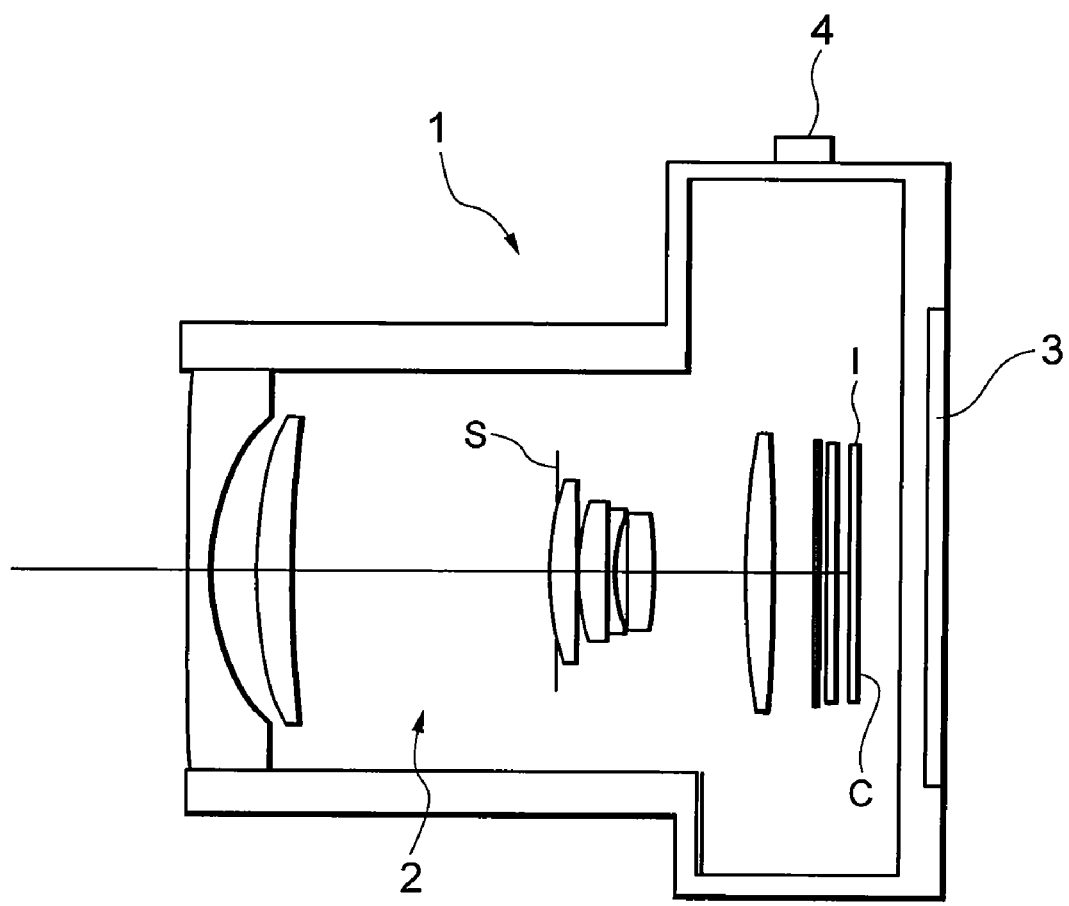
FIG. 12 is a cross-sectional view along the A-A line in FIG. 11A.

FIGS. 11A and 11B are diagrams showing an electronic still camera equipped with a zoom lens system according to Example 1, in which FIG. 11A is a front view and FIG. 11B is a rear view. FIG. 12 is a cross-sectional view along the A-A line in FIG. 11A.

In an electronic still camera 1 (hereinafter called a camera) according to the present embodiment shown in FIGS. 11A, 11B and 12, when a power switch button (not shown) is pressed, a shutter (not shown) of an image-taking lens 2, which is the zoom lens system according to Example 1, is opened and light from an object (not shown) is collected by the image-taking lens 2 and an image is formed on an imaging device C (such as CCD, CMOS, and the like) disposed on an image plane I. The object image formed on the imaging device C is displayed on a liquid crystal monitor 3 disposed backside of the camera 1. After fixing the composition of the object image with observing the liquid crystal monitor 3, a photographer depresses a release button 4 to take a picture of the object image by the imaging device C, and stores in a memory (not shown).

Moreover, in the camera 1, there are disposed such as an auxiliary light emitter 5 that emits auxiliary light when the object is dark, a W-T button 6 that makes the zoom lens system, which is the image-taking lens 2, zoom from a wide-angle end state (W) to a telephoto end state (T), and a function button 7 that is used for setting various conditions of the camera 1.

Furthermore, in the electronic still camera 1 according to the present embodiment, the image-taking lens 2 has a vibration reduction function, so that an image blur can be corrected.

In this manner, the camera 1 equipped with the zoom lens system 2 according to Example 1 is constructed.

Incidentally, the following description may suitably be applied within limits that do not deteriorate optical performance.

In each Example, although a three-lens-group configuration is explained, the present embodiment makes it possible to adopt other lens configurations such as a four-lens-group configuration and a five-lens-group configuration.

In order to carry out focusing from infinity to a close-range object, a portion of a lens group, a single lens group, or a plurality of lens groups may be moved along the optical axis.

The focusing lens group(s) may be used for auto focus, and suitable for being driven by a motor such as an ultrasonic motor. In a zoom lens system according to the present embodiment, the third lens group may preferably be used for the focusing lens group.

In a zoom lens system according to present embodiment, in order to correct an image blur caused by a camera shake, a portion of a lens group, or a single lens group may be shifted as a vibration reduction lens group in a direction perpendicular to the optical axis. In a zoom lens system according to present embodiment, it is preferable that the second lens group or a portion of the second lens group is used for the vibration reduction lens group.

Moreover, any lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass lens surface.

Moreover, although an aperture stop for defining an f-number is preferably disposed in the vicinity of the second lens group, the function may be substituted by a lens frame without disposing a member as the aperture stop.

An antireflection coating having high transmittance over a broad wavelength range may be applied to each lens surface to reduce flare or ghost images, so that high optical performance with a high contrast can be attained.

Moreover, the zoom lens system may be formed in a body with the imaging device, or may be separable as an interchangeable lens.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A zoom lens system comprising, in order from an object along an optical axis:
a first lens group having negative refractive power;
a second lens group having positive refractive power; and
a third lens group having positive refractive power;
for zooming from a wide-angle end state to a telephoto end state, each distance between adjacent lens groups is variable, and the following conditional expression being satisfied:

$$0.45816 < (Nnav - 0.80) \times ft \times \tan \omega w / TLw < 0.90$$

where Nnav denotes an average of refractive indices at d-line (wave length λ=587.6 nm) of all negative lenses included in the zoom lens system, ft denotes a focal length of the zoom lens system in the telephoto end state, ωw denotes a half angle of view of the zoom lens system in the wide-angle end state, and TLw denotes a total lens length of the zoom lens system in the wide-angle end state.

2. The zoom lens system according to claim 1, wherein for zooming from the wide-angle end state to the telephoto end state, at least the first lens group and the second lens group are movable such that a distance between the first lens group and the second lens group decreases, and a distance between the second lens group and the third lens group increases.

3. The zoom lens system according to claim 1, wherein the following conditional expression is satisfied:

$$0.30 < ft \times L12t / |f1| < 2.00$$

where L12t denotes a distance along the optical axis between the most image side lens surface of the first lens group and the most object side lens surface of the second lens group in the telephoto end state, and f1 denotes a focal length of the first lens group.

4. The zoom lens system according to claim 1, wherein the following conditional expression is satisfied:

$$0.21 < ft \times |X2| / TLw2 < 0.30$$

where X2 denotes the maximum amount the second lens group is movable for zooming from the wide-angle end state to the telephoto end state.

5. The zoom lens system according to claim 1, wherein the following conditional expression is satisfied:

$$0.43 < L23w / f2 < 0.80$$

where L23w denotes a distance along the optical axis between the most image side lens surface of the second lens group and the most object side lens surface of the third lens group in the wide-angle end state, and f2 denotes a focal length of the second lens group.

6. The zoom lens system according to claim 1, wherein the second lens group comprises, in order from the image along the optical axis, a positive lens, an air space along the optical axis, and a negative lens.

7. The zoom lens system according to claim 6, wherein the following conditional expressions are satisfied:

$$0.36 < Nn - Np < 0.80$$

$$3.00 < Nn + 0.05 \times \nu n$$

where Nn denotes refractive index of the negative lens in the second lens group at d-line (wavelength λ=587.6 nm), Np denotes refractive index of the positive lens in the second lens group at d-line (wavelength λ=587.6 nm), and νn denotes Abbe number of the negative lens in the second lens group at d-line (wavelength λ=587.6 nm).

8. The zoom lens system according to claim 1, wherein the first lens group includes, in order from the object along the optical axis, at least one negative lens and a positive lens.

9. The zoom lens system according to claim 1, wherein each of the first lens group and the second lens group includes at least one negative lens, and the following conditional expression is satisfied:

$$0.08 < N2av - N1av < 0.40$$

where N2av denotes an average of refractive indices of all negative lenses included in the second lens group at d-line (wavelength λ=587.6 nm), and N1av denotes an average of refractive indices of all negative lenses included in the first lens group at d-line (wavelength λ=587.6 nm).

10. The zoom lens system according to claim 1, wherein at least one lens surface of a negative lens in the first lens group is an aspherical surface.

11. The zoom lens system according to claim 1, wherein the second lens group includes, in order from the object along the optical axis, two positive lenses, a negative lens, and a positive lens.

12. The zoom lens system according to claim 1, wherein at least one lens surface of a positive lens disposed to the most object side of the second lens group is an aspherical surface.

13. An optical apparatus equipped with the zoom lens system according to claim 1.

14. The method according to claim 1, wherein the following conditional expression is satisfied:

$$0.47 < (Nnav-0.80) \times ft \times \tan\omega w/TLw < 0.90.$$

15. A zoom lens system comprising, in order from an object along an optical axis:
   a first lens group having negative refractive power;
   a second lens group having positive refractive power; and
   a third lens group having positive refractive power,
   upon zooming from a wide-angle end state to a telephoto end state, at least the first lens group and the second lens group being moved such that a distance between the first lens group and the second lens group varies, and a distance between the second lens group and the third lens group varies, and
   the following conditional expressions being satisfied:

$$0.21 < ft \times |X2|/TLw2 < 0.27$$

$$0.45486 < L23w/f2 < 0.80$$

where ft denotes a focal length of the zoom lens system in the telephoto end state, X2 denotes the maximum moving amount of the second lens group upon zooming from the wide-angle end state to the telephoto end state, TLw denotes a total lens length of the zoom lens system in the wide-angle end state, L23w denotes a distance along the optical axis between the most image side lens surface of the second lens group and the most object side lens surface of the third lens group in the wide-angle end state, and f2 denotes a focal length of the second lens group.

16. The zoom lens system according to claim 15, wherein the following conditional expression is satisfied:

$$0.30 < ft \times L12t/|f1| < 2.00$$

where L12t denotes a distance along the optical axis between the most image side lens surface of the first lens group and the most object side lens surface of the second lens group in the telephoto end state, and f1 denotes a focal length of the first lens group.

17. The zoom lens system according to claim 15, wherein the second lens group comprises, in order from the image along the optical axis, a positive lens, an air space along the optical axis, and a negative lens.

18. The zoom lens system according to claim 17, wherein the following conditional expressions are satisfied:

$$0.36 < Nn-Np < 0.80$$

$$3.00 < Nn+0.05 \times vn$$

where Nn denotes refractive index of the negative lens in the second lens group at d-line (wavelength λ=587.6 nm), Np denotes refractive index of the positive lens in the second lens group at d-line (wavelength λ=587.6 nm), and vn denotes Abbe number of the negative lens in the second lens group at d-line (wavelength λ=587.6 nm).

19. A zoom lens system comprising, in order from an object along an optical axis:
   a first lens group having negative refractive power;
   a second lens group having positive refractive power; and
   a third lens group having positive refractive power,
   upon zooming from a wide-angle end state to a telephoto end state, at least the first lens group and the second lens group being moved such that a distance between the first lens group and the second lens group varies, and a distance between the second lens group and the third lens group varies,
   the second lens group comprising, in order from the image side along the optical axis, a positive lens, an air space along the optical axis, and a negative lens; and
   the following conditional expressions being satisfied:

$$0.36 < Nn-Np < 0.80$$

$$3.00 < Nn+0.05 \times vn$$

where Nn denotes refractive index of the negative lens in the second lens group at d-line (wavelength λ=587.6 nm), Np denotes refractive index of the positive lens in the second lens group at d-line (wavelength λ=587.6 nm), and vn denotes Abbe number of the negative lens in the second lens group at d-line (wavelength λ=587.6 nm).

20. The zoom lens system according to claim 19, wherein the second lens group includes, in order from the object along the optical axis, two positive lenses, a negative lens, and a positive lens.

21. The zoom lens system according to claim 19, wherein at least one lens surface of a positive lens disposed to the most object side of the second lens group is an aspherical surface.

22. A method for zooming a zoom lens system comprising steps of:
   providing the zoom lens system including, in order from an object along an optical axis, a first lens group having negative refractive power, a second lens group having positive refractive power, and a third lens group having positive refractive power;
   satisfying the following conditional expression:

$$0.45816 < (Nnav-0.80) \times ft \times \tan\omega w/TLw < 0.90$$

where Nnav denotes an average of refractive indices at d-line (wave length λ=587.6 nm) of all negative lenses included in the zoom lens system, ft denotes a focal length of the zoom lens system in the telephoto end state, ωw denotes a half angle of view of the zoom lens system in the wide-angle end state, and TLw denotes a total lens length of the zoom lens system in the wide-angle end state; and
   varying each distance between adjacent lens groups upon zooming from a wide-angle end state to a telephoto end state.

23. The method according to claim 22, wherein the following conditional expression is satisfied:

$$0.30 < ft \times L12t/|f1| < 2.00$$

where L12t denotes a distance along the optical axis between the most image side lens surface of the first lens group and the most object side lens surface of the second lens group in the telephoto end state, and f1 denotes a focal length of the first lens group.

24. The method according to claim 22, wherein the following conditional expression is satisfied:

$$0.21 < f t \times |X2|/TLw2 < 0.30$$

where X2 denotes the maximum moving amount of the second lens group upon zooming from the wide-angle end state to the telephoto end stat.

25. The method according to claim 23, wherein the following conditional expression is satisfied:

$$0.43 < L23w/f2 < 0.80$$

where L23w denotes a distance along the optical axis between the most image side lens surface of the second lens group and the most object side lens surface of the third lens group in the wide-angle end state, and f2 denotes a focal length of the second lens group.

* * * * *